United States Patent [19]

Baba

[11] Patent Number: 4,801,564
[45] Date of Patent: Jan. 31, 1989

[54] HIGH-TOUGHNESS CERAMIC TOOL MATERIALS

[75] Inventor: Hidetoshi Baba, Aichi, Japan

[73] Assignee: 501 NGK Spark Plug Co., Ltd., Nagoya, Japan

[21] Appl. No.: 875,016

[22] Filed: Jun. 17, 1986

[30] Foreign Application Priority Data

Jun. 17, 1985 [JP] Japan ................... 60-130021

[51] Int. Cl.⁴ .............. C04B 35/56; C04B 35/58; C04B 35/80
[52] U.S. Cl. ............................ 501/92; 501/98
[58] Field of Search ............ 501/92, 96, 97, 98, 501/88, 95; 51/307

[56] References Cited

U.S. PATENT DOCUMENTS

| | | | |
|---|---|---|---|
| 4,327,187 | 4/1982 | Komatsu et al. | 501/97 |
| 4,563,433 | 1/1986 | Yeckley et al. | 501/97 |
| 4,594,106 | 6/1986 | Tanaka et al. | 106/1.12 |
| 4,678,658 | 6/1987 | Gadkaree et al. | 501/89 |

FOREIGN PATENT DOCUMENTS 2157282 10/1985 United Kingdom .

Primary Examiner—William R. Dixon, Jr.
Assistant Examiner—Ann M. Knab
Attorney, Agent, or Firm—Wegner & Bretschneider

[57] ABSTRACT

A high-toughness ceramic tool material consisting essentially of 50–95% by volume of a main sialon base phase wherein at least 10% by volume of the sialon base phase consists of alpha-sialon, and 5–50% by volume of a SiC whisker phase. This ceramic material is produced by sintering a composition comprising:

50–95% by volume of a sialon forming component such that at least 10% by volume, calculated on the entire sialon, of alpha-sialon is formed, and 5–50% volume of SiC whiskers;

said sialon forming component consisting essentially of 50–95% by weight of $Si_3N_4$ and 50–50% by weight of constituents of sialon-consistituting elements other than $Si_3N_4$, said constituents consisting of a mixture of AlN and $Al_2O_3$, and at least one oxide selected from the group consisting of oxides of yttrium and rare earth elements, said mixture of AlN and $Al_2O_3$ containing at least 60% by weight of AlN calculated on said mixture, and said mixture and said at least one oxide being in a ratio of 1:3 to 3:1 by weight.

The ceramic tool has high toughness and wear-resistance.

16 Claims, 1 Drawing Sheet

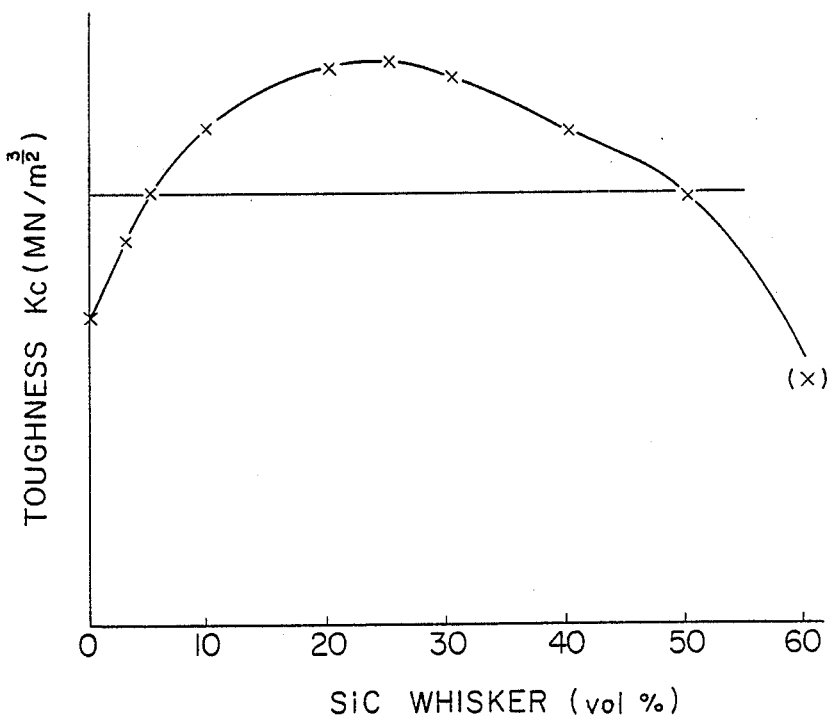

HIGH-TOUGHNESS CERAMIC TOOL MATERIALS

BACKGROUND OF THE INVENTION

The present invention relates to improvements in or relating to a sialon base ceramic material which can be applied to cutting tools or wear-resistant tools.

Sialon is generally classified into beta-sialon that is obtained by adding $Al_2O_3$, AlN, $SiO_2$, etc. to $Si_3N_4$, followed by heating to form a solid-solution thereof, and is expressed in terms of the general formula $Si_{6-z}Al_zO_zN_{3-z}$ wherein $0<z\leq 4.3$, and alpha-sialon that has a metal element M occupied as a solid-solution in its lattice, and is expressed in terms of the general formula $M_x(Si,Al)_{12}(O,N)_{16}$ where $0<x\leq 2$. The former beta-sialon possesses high toughness but low hardness, whereas the latter alpha-sialon possesses relatively low toughness but high hardness.

Of these two types of sialon, various attempts have been made to make effective use of beta-sialon as tool materials, because of its high toughness. Not until now, however, have there been known any substantial attempts to use alpha-sialon as a tool material.

SUMMARY OF THE DISCLOSURE

A primary object of the present invention is to provide an alpha-sialon base ceramic tool materials.

Another object of the present invention is to provide tool materials which have an excellent toughness and resistance to thermal shock and fracture.

A further object of the present invention is to provide ceramic tool materials which have a high strength and wear resistance.

A still further object of the present invention is to provide ceramic tool materials which have exellent chemical and thermal stabilities.

A still further object of the present invention is to provide a ceramic tool material composition for producing any of aforementioned ceramic tool materials. Other objects will become apparent in the entire disclosure.

According to a first aspect of the present invention there is provided:

a high-toughness ceramic tool material consisting essentially of 50–95% by volume of a main sialon base phase wherein at least 10% by volume of the sialon base phase consists of alpha-sialon, and 5–50% by volume of a SiC whisker phase.

According to a second aspect of the present invention, there is provided:

a high toughness ceramic tool material composition consisting essentially of:

50–95% by volume of a sialon forming component such that at least 10% by volume, calculated on the entire sialon, of alpha-sialon is formed, and 5–50% by volume of SiC whiskers;

said sialon forming component consisting essentially of 50–95% by weight of $Si_3N_4$ and 5–50% by weight of constituents of sialon-constituting elements other than $Si_3N_4$, said constituents consisting of a mixture of AlN and $Al_2O_3$, and at least one oxide selected from the group consisting of oxides of yttrium and rare earth elements, said mixture of AlN and $Al_2O_3$ containing at least 60% by weight of AlN calculated on said mixture, and said mixture and said at least one oxide being in a ratio of 1:3 to 3:1 by weight.

Sintered bodies according to the present invention on the one hand contains an alpha-sialon phase as a key component and, thus have a thermal shock resistance as high as that of $Si_3N_4$ and a hardness comparable to that of $Al_2O_3$ for giving a high wear resistance as well as a high chemical and thermal stability, however, on the other hand have a high toughness due to the incorporation of dispersed SiC whiskers, thus have an excellent resistance to thermal shock and fracture even though alpha-sialon is present. Namely, the incorporation of 5–50 vol % of SiC whiskers into such sintered bodies can provide tools freed of the defect as mentioned just above and having other improved properties.

In other words, according to the present invention, while the thermal shock resistance and fracture resistance, that are the advantages of $Si_3N_4$- or beta-sialon-base tools, are maintained, improvements have been introduced into the wear resistance that is one disadvantage thereof in the following manner.

(1) Reactivity with Fe

In the case of cutting steel, not only is the cutting resistance (responsible for heat generation) large, but considerable wearing tends to occur, because built-up edge formation or peeling-off of the cutting edge takes place due to the chemical affinity of Fe in the steel with respect to Si in the ceramics. According to the present invention, however, the reactivity with Fe is extremely reduced, since SiC whiskers that are chemically very stable are dispersed throughout a matrix of sialon containing an alpha-phase that is relatively chemically stable.

(2) Hardness

A matrix of sialon phase containing alpha-sialon having a relatively high hardness is dispersed therein with SiC whiskers having a much higher hardness.

(3) High-Temperature Property Deterioration

It appears that high-temperature property deteriorations occur due to the fact that the grain boundary glass phase is softened at high temperatures so that the grains tend to slip. However, this is avoided by the dispersion of SiC whiskers so as to delay the high-temperature property deterioration.

(4) Improvement in Toughness

Alpha-sialon containing sialon is inferior in the toughness to $Si_3N_4$ or beta-sialon, but is allowed to show a toughness comparable to the toughness of $Si_3N_4$ or beta-sialon by the dispersion of SiC whiskers.

According to the present invention, there can be provided a ceramic tool material containing alpha-sialon as the key ingredient, which has high hardness and wear resistance, and is allowed to have further high hardness, undergo considerably reduced deterioration in the high-temperature properties and show improved toughness by the dispersion of SiC whiskers. From that ceramic material, it is possible to produce tools wich can be used over an extended period of time as the wear-resistant tools such as cutting tools, bearings, dies for drawing and the like.

Preferred embodiments of the present invention will be described in the appended dependent claims, and will be disclosed in the following further detailed explanation.

BRIEF DESCRIPTION OF THE DRAWING

Single FIGURE is a graph showing the relation between the amount of SiC whisker and the toughness (critical stress-intensity factor Kc).

DESCRIPTION OF THE PREFERRED EMBODIMENTS

In the present invention, the amount of the SiC whisker phase in the sintered ceramic body (first aspect) and SiC whiskers in the material composition (second aspect) should be each 5–50% by volume based on total amount of the ceramic body or composition. Only an insufficient effect upon improvement in toughness is attained in an amount of below 5 vol %, whereas difficulty is involved in densification in an amount exceeding 50 vol %.

That is, the materials have a toughness (Kc) of at least 6 $MN/m^{3/2}$ within the above range of SiC whisker's amount. The amount of the SiC whiskers is preferably 10–40 vol %, more preferably 20–30 vol %. It is understood that, in view of improvement in toughness, SiC whiskers have preferably a length of 5–200 micrometers and a diameter of 0.05–1.5 micrometers.

First Aspect

The main sialon base phase should contain 50–95 vol % of the sialon phase, based on the total amount of the main sialon base phase. This is because, at an amount below 50 vol %, a higher strength due to the sialon phase is not obtained, or at an amount exceeding 95 vol %, there is deterioration in the toughness. The amount of the sialon phase is preferably 60–90 vol %, more preferably 75–90 vol %.

The sialon phase consists essentially of both the alpha-sialon phase and beta-sialon phase in the present invention and should contain at least 10 vol % of the alpha-sialon phase (calculated on the entire sialon phase) since there is a drop of stability and hardness in an amount of below 10 vol %. The amount of the alpha-sialon is preferably at least 30 vol %, more preferably at least 50%.

The main sialon phase may contain a glass phase and various crystal phases as the grain boundary phase other than the sialon phase. This is because, the bonding between constructive grains is stronger, and sintering to a high density can be made without extraordinary grain growth.

It is required that the sialon base ceramic tool materials of the present invention have a mean crystal grain size of 5 micrometer or less, since there is a drop of toughness and strength at a size exceeding 5 micrometers. A mean crystal grain size of 3 micrometer or less is preferred.

In addition, to afford improved toughness and strength to the sialon base ceramic tool materials of the present invention, it is desired that they have a density relative to theoretical of at least 95%, more preferably at least 98%.

Second Aspect

The alpha-sialon phase is comprised of a solid solution of the metal elements M in the lattice of the $Si_3N_4$ type structure wherein M is Y and/or rare earth elements etc. locating in the interstatial space of solid lattice structure, while Al and O elements are substituted for Si and N to form a substitution type solid solution resulting in the structure of the general formula:

$$M_x(Si,Al)_{12}(O,N)_{16}.$$

The (at least 10 vol % α-sialon containing) sialon forming component comprises $Si_3N_4$ as a main constituent (50–95 wt %), and the other constituents of sialon-constituting elements (5–50 wt %). The $Si_3N_4$ should be almost α-$Si_3N_4$, i.e., at least 75 wt %, preferably at least 90 wt %, based on the total $Si_3N_4$ amount.

In the present invention, the other constituents of sialon-constituting elements comprise a mixture of AlN with $Al_2O_3$; and at least one of the oxides of Y and rare earth elements, by which incorporation of sialon phase containing at least 10 vol % alpha-sialon based on the entire sialon phase results.

AlN and $Al_2O_3$ are added for the purpose of forming sialon with $Si_3N_4$ and as sintering aids. Here, it appears that AlN and $Al_2O_3$ serve to increase a bonding strength between SiC whiskers and a matrix composed mainly of sialon phase.

$Y_2O_3$ and the oxides are rare earth elements provide a metal corresponding to M in the aforesaid general formula $M(Si,Al)_{12}(O,N)_{16}$ are added as sintering aids, while $Y_2O_3$, $Dy_2O_3$ and/or $CeO_2$ are preferred.

The constituents of the sialon-constituting elements other than $Si_3N_4$ should be 5–50 wt %, based on the total amount of the sialon forming component. Densification is difficult in an amount of this constituents below 5 wt %, and high-temperature properties deteriorate in an amount of this constituents that exceeds 50 wt %. The amount of the above constituents is preferably in a range of 10–30 wt %.

Additionally, the ratio of the AlN-$Al_2O_3$ mixture relative to the oxides is in a range of ⅓–3/1 by weight.

When that ratio is above 3/1, not only is it difficult to occur any completed alpha-sialon obtained due to the fact that M in the general formula is insufficient, but difficulty is experienced in carrying out effective sintering. When that ratio is below ⅓ high-temperature properties deteriorate. This ratio is preferably 2:1 to 1:2 by weight.

In the AlN-$Al_2O_3$ mixture, AlN should be at least 60 wt %, based on the total amount of the AlN-$Al_2O_3$ mixture. When the AlN content of AlN-$Al_2O_3$ mixture is below 60%, difficulty is encountered in the formation of alpha-sialon with a drop of hardness for unknown reason. The amount of AlN is preferably at least 70 wt % based on the AlN-$Al_2O_3$ mixture.

For instance, the sialon base ceramics of the present invention may be produced in the following manner.

The starting various materials $Si_3N_4$, AlN and $Al_2O_3$ etc are milled and mixed to a powdery mixture in predetermined amounts so as to form the sialon phase containing a predetermined amount of alpha-sialon. In one case, after the starting materials for the sialon forming component has been sufficiently mixed in predetermined amounts, a predetermined amount of SiC whiskers is added to the resulting mixture. However, SiC whiskers may be added from the outset to any of the respective silalon forming components, which may then be mixed together. The resultant mixture is in turn compacted into compacts with desired shapes.

Then, the resulting compacts may be sintered by applying pressure, e.g., by a hot press (HP) or hot isostatic press (HIP) process etc. The sintering conditions may be as follows; in the case of the HP process, a temperature of 1600°–2000° C. and a pressure of 100–500 $kgf/cm^2$ (and in a graphite mold); in the case of the HIP process, a temperature 1650°–2000° C. and a pressure of 10–2000 kgf/cm². It is preferred to sinter in a nonoxidizing atmosphere such as inert gas. However, satisfactory results are also obtained by sintering such powders at 1650°–2000° C. under a low pressure no more than 10 kgf/cm², so far as SiC whiskers are decreased in length, or are oriented during molding.

It should be understood that following Examples are being presented for better elucidation of the present invention and not for merely limitative purpose, and that any modifications or changes as apparent in the art may be done without departing from the inventive gist.

Eighty (80) weight % of Si$_3$N$_4$ having a mean particle size of 0.7 micrometers and an alpha-sialon content of 90%, 10 weight % of Y$_2$O$_3$ having a mean particle size of 1.2 micrometers, 7 weight % of AlN having a mean particle size of 1.2 micrometers, 3 weight % of Al$_2$O$_3$ having a mean particle size of 0.7 micrometers were mixed and milled for one day in a ball mill, and a predetermined amount of SiC whiskers having a diameter of 0.1–1.5 micrometers and a length of 10–200 micrometers were thereafter added to the resulting mixture for further half-day mixing. After drying, the thus obtained mixed powders were passed through a 60-mesh sieve, and were hot-pressed at 1800° C. and 300 kgf/cm² in a carbon mold.

FIG. 1 is a graph showing the toughness of the obtained sintered bodies, which was measured by the indentation technique using a Vickers hardness meter, and was calculated from the Niihara's equation. From the FIG. 1, it is found that a high toughness value (Kc) comparable to Si$_3$N$_4$ sintered bodies having a toughness value of about 6 MN/m$^{3/2}$, or higher values are obtained, when the amount of SiC whiskers is in the range of 5 to 50 weight %.

In this connection, it is noted that high-toughness ZrO$_2$ and Si$_3$N$_4$ show toughness values(Kc) of about 10 MN/m$^{3/2}$ and about 5 to 6 MN/m$^{3/2}$, respectively.

Example 2

Si$_3$N$_4$ having a mean particle size of 0.7 micrometers and an alpha-Si$_3$N$_4$ content of 90%, Y$_2$O$_3$ having a mean particle size of 1.2 micrometers, Dy$_2$O$_3$ having a mean particle size of 1.0 micrometers, AlN having a mean particle size of 1.2 micrometers, Al$_2$O$_3$ having a mean particle size of 0.7 micrometers and SiC whiskers having a diameter of 0.1–1.5 micrometers and a length of 10–200 micrometers were weighed into the compositions set forth in Table 1. It is noted that the amount of SiC whiskers was fixed at 25 vol %.

Predetermined amounts of Si$_3$N$_4$, Y$_2$O$_3$, Dy$_2$O$_3$, AlN and Al$_2$O$_3$ were mixed and milled for one day in a ball mill, and SiC whiskers were thereafter added to the resulting mixtures for further half-day mixing. After drying, the powders were passed through a 60-mesh sieve, charged in a carbon mold, and were hot-pressed therein at 1700°–1900° C. and 300 kgf/cm².

The relative density and Rockwell superficial hardness of the resulting sintered bodies were measured according to JIS Z 8807 and JIS Z 2245, respectively. The resulting measurements are set forth in Table 1.

For convenience, the alpha-phase content was from the following equation:

$$\alpha\text{-phase content}(\%) = \frac{I_{\alpha(102)} + I_{\alpha(210)}}{I_{\alpha(102)} + I_{\alpha(210)} + I_{\beta(101)} + I_{\beta(210)}} \times 100$$

wherein $I_\alpha$ is the alpha-phase peak intensity and $I_\beta$ is the beta-phase peak intensity, based on the diffraction peak intensities in X-ray diffraction.

From Table 1, it is found that there was little or no sign of any alpha-phase and a drop of hardness, when the amount of AlN with respect to (AlN+Al$_2$O$_3$) was 60 weight % or lower. When the ratio of Y$_2$O$_3$/(AlN+Al$_2$O$_3$) was below ⅓ (Sample No. 7) and above 3/1 (Sample No. 8), the sintering properties of the samples were unsatisfactory. Such deterioration in the sintering properties of the samples was also observed, when the total amount of the additive was 5 below 5 weight % (Sample No. 4) and above 50 weight % (Sample No. 6).

TABLE 1

| Sample Nos. | Composition wt % | | | | | α-phase content % | relative density % | hardness H45N | out of/in the inv. |
| --- | --- | --- | --- | --- | --- | --- | --- | --- | --- |
| | Si$_3$N$_4$ | Y$_2$O$_3$ | Dy$_2$O$_3$ | AlN | Al$_2$O$_3$ | | | | |
| 1 | 80 | 10 | — | 7 | 3 | 32 | 100 | 90 | in |
| 2 | " | " | — | 10 | 0 | 85 | 99 | 91 | " |
| 3 | " | " | — | 5 | 5 | 0 | 99 | 87 | out |
| 4 | 95.5 | 2 | — | 1.5 | 1 | 0 | 86 | 84 | " |
| 5 | 55 | 20 | — | 15 | 10 | 15 | 99 | 89 | in |
| 6 | 45 | 25 | | 20 | 10 | 28 | 97 | 86 | out |
| 7 | 80 | 4 | | 12 | 4 | 27 | 96 | 85 | " |
| 8 | " | 16 | | 3 | 1 | 50 | 93 | 84 | " |
| 9 | 70 | 10 | | 15 | 5 | 35 | 99 | 90 | in |
| 10 | " | 20 | | 7.5 | 2.5 | 76 | 100 | 91 | " |
| 11 | 80 | | 10 | 7 | 3 | 41 | 99 | 90 | " |
| 12 | " | 5 | 5 | 7 | 3 | 36 | 100 | 90 | " |

Example 3

Sample No. 1 of Ex. 2 was machined and polished into a shape of SNGN 433, and was estimated in respect of the cutting performance under the conditions set forth in Table 2 for the purpose of comparison with commercially available Si$_3$N$_4$ base tools and Al$_2$O$_3$-TiC base tools.

As a result, when five passes of cutting were carried out, Sample No. 1, the Si$_3$N$_4$ base and Al$_2$O$_3$TiC base tools showed a flank wear V$_B$ of 0.16 mm, 0.23 mm and 0.15 mm. After completion of six passes of cutting, the Al$_2$O$_3$-TiC base tool fractured. Further, after 12 passes of cutting (30 min.), Sample No. 1 showed V$_B$ of 0.2 mm, whereas the Si$_3$N$_4$ base tool showed V$_B$ of as large as 0.3 mm. Thus, it is found that the invented ceramic tools are comparable in wear resistance to those based on Al$_2$O$_3$-TiC, and are substantially equivalent in fracture resistance to those based on Si$_3$N$_4$.

TABLE 2

| | |
| --- | --- |
| Material to be cut | FC 20 |
| Shape of Material to be cut | diameter 300 × 300 mm |
| Cutting Conditions | Wet-cutting of circumferential surface |

TABLE 2-continued

| | |
|---|---|
| Cutting Speed | V = 400 m/min |
| Rate of Feed | f = 0.3 mm/rev. |
| Depth of Cutting | t = 2 mm |

What is claimed is:

1. A high-toughness ceramic tool material consisting essentially of 50–95% by volume of a main sialon base phase, wherein at least 10% by volume of the sialon base phase consists of alpha-sialon, and 5–50% by volume of a SiC whisker phase.

2. A ceramic tool material as defined in claim 1, wherein 50–95% by volume of the sialon base phase consists of 50 to 95% by volume of sialon calculated on the main sialon base phase.

3. A ceramic tool material as defined in claim 2, wherein at least 30% by volume of the main sialon base phase consists of alpha-sialon.

4. A ceramic tool material as defined in claim 3, wherein at least 50% by volume of the main sialon base phase consists of alpha-sialon.

5. A ceramic tool as defined in claim 1, wherein the SiC whisker phase occupies 10–40% by volume of the entire material.

6. A ceramic tool as defined in claim 5, wherein the SiC whisker phase occupies 20–30% by volume of the entire material.

7. A ceramic tool as defined in claim 1, wherein the main sialon base phase has an average crystal grain size not exceeding 5 micrometers.

8. A ceramic tool as defined in claim 1, which has a relative density of at least 95% of the theoretical density.

9. A ceramic tool as defined in claim 1, which further includes at least one element derived from sintering aids which are selected from oxides of yttrium and rare earth elements.

10. A high toughness ceramic tool material composition consisting essentially of:
- 50–95% by volume of a component forming a silaon phase such that at least 10% by volume, calculated on the entire sialon, of alpha-sialon is formed, and
- 5–50% by volume of SiC whiskers disposed in said component;

said component consisting essentially of 50–95% by weight of $Si_3N_4$ and 5–50% by weight of constituents of sialon-constituting elements other than $Si_3N_4$, said constituents consisting of a mixture of AlN and $Al_2O_3$, and at least one oxide selected from the group consisting of oxides of yttrium and rare earth elements, said mixture of AlN and $Al_2O_3$ containing at least 60% by weight of AlN calculatd on said mixture, and said mixture and said at least one oxide being in a ratio of 1:3 to 3:1 by weight.

11. A composition as defined in claim 10, wherein the amount of SiC whiskers is 10–40% by volume.

12. A composition as defined in claim 11, wherein the SiC amount of SiC whiskers is 20–30% by volume.

13. A composition as defined in claim 10, wherein the SiC whiskers have a length of 5–200 micrometer and a diameter of 0.05–1.5 micrometer.

14. A composition as defined in claim 10, wherein said at least one oxide is $Y_2O_3$, $Dy_2O_3$, and/or $CeO_2$.

15. A composition as defied in claim 10, wherein AlN amounts to at least 70% by weight calculated on the mixture of AlN and $Al_2O_3$.

16. A composition as defined in claim 10, wherein said mixture and said oxide are in a ratio of 1:2 to 2:1 by weight.

* * * * *